United States Patent [19]

Bielawski et al.

[11] 4,122,519
[45] Oct. 24, 1978

[54] DATA HANDLING MODULE FOR PROGRAMMABLE CONTROLLER

[75] Inventors: Timothy Bielawski, Maple Heights; Odo J. Struger, Chagrin Falls; Lawrence W. DeLong, Stow, all of Ohio

[73] Assignee: Allen-Bradley Company, Milwaukee, Wis.

[21] Appl. No.: 750,572

[22] Filed: Dec. 14, 1976

[51] Int. Cl.$^2$ .................... G06F 13/08; G06F 9/19; G06F 15/46

[52] U.S. Cl. .................................. 364/200; 364/104

[58] Field of Search ... 364/200 MS Files, 900 MS File, 364/101, 104, 107

[56] References Cited

U.S. PATENT DOCUMENTS

| | | | |
|---|---|---|---|
| 3,581,291 | 5/1971 | Iwamoto et al. | 364/200 |
| 3,614,740 | 10/1971 | Delagi et al. | 364/200 |
| 3,638,195 | 1/1972 | Brender et al. | 364/200 |
| 3,653,001 | 3/1972 | Ninke | 364/200 |
| 3,665,487 | 5/1972 | Campbell et al. | 364/200 |
| 3,781,810 | 12/1973 | Downing | 364/200 |
| 3,810,104 | 5/1974 | Markley | 364/200 |
| 3,878,513 | 4/1975 | Werner | 364/200 |
| 3,942,158 | 3/1976 | Dummermuth | 364/900 |
| 3,955,180 | 5/1976 | Hirtle | 364/200 |
| 3,956,739 | 5/1976 | Ophir et al. | 364/900 |
| 3,997,879 | 12/1976 | Markley et al. | 364/900 |
| 3,999,163 | 12/1976 | Levy et al. | 364/200 |
| 4,006,464 | 2/1977 | Landell | 364/900 |
| 4,025,504 | 5/1977 | Chowning et al. | 364/200 |
| 4,028,668 | 7/1977 | Riikonen | 364/200 |
| 4,029,950 | 6/1977 | Haga | 364/104 |
| 4,034,354 | 7/1977 | Simmons | 364/900 |
| 4,038,533 | 7/1977 | Dummermuth et al. | 364/104 |
| 4,045,660 | 8/1977 | Weisgerber et al. | 364/107 |
| 4,047,161 | 9/1977 | Davis | 364/200 |
| 4,048,623 | 9/1977 | Gruner | 364/200 |
| 4,053,950 | 11/1977 | Bourke et al. | 364/200 |
| 4,056,848 | 11/1977 | Gilley | 364/900 |
| 4,058,711 | 11/1977 | Ondercin et al. | 364/104 |
| 4,064,395 | 12/1977 | Schubeler et al. | 364/107 |
| 4,067,058 | 1/1978 | Brandstaetter et al. | 364/200 |
| 4,068,297 | 1/1978 | Komiva | 364/107 |

*Primary Examiner*—Gareth D. Shaw
*Assistant Examiner*—Jan E. Rhoads
*Attorney, Agent, or Firm*—Quarles & Brady

[57] ABSTRACT

A data handling module connects to the memory of a programmable controller and operates to periodically steal memory cycles from the controller processor to read data out of the memory and write data into it. The data handling module includes a microprocessor which is programmed to perform a number of functions. The function to be performed is indicated by a control status register which is set by the control program and which is periodically examined by the data handling module. The status of the data handling module is also indicated by a register which is examined by programmable controller instructions. In response to directions indicated by the control status register, data files may be transferred between a data file storage and an active data file storage area and messages may be coupled to a TTY which connects to the data handling module.

4 Claims, 11 Drawing Figures

DATA HANDLING MODULE FOR PROGRAMMABLE CONTROLLER

BACKGROUND OF THE INVENTION

The field of the invention is industrial digital control systems, and particularly, programmable controllers such as that disclosed in U.S. Pat. No. 3,942,158 issued Mar. 2, 1976, and entitled "Programmable Logic Controller".

Programmable controllers are typically connected to industrial equipment such as assembly lines and machine tools to sequentially operate the equipment in accordance with a stored control program. In programmable controllers such as that disclosed in the above cited patent, for example, the control program is stored in a random access memory and includes instructions which are executed in rapid sequence to examine the condition of selected sensing devices on the controlled equipment and instructions which energize or deenergize selected operating devices on the controlled equipment contingent upon the status of one or more of the examined sensing devices.

Programmable controllers are distinguishable in both structure and application from process controllers which employ general purpose digital computers to control industrial equipment and processes. Whereas the primary function of a process controller may be to monitor a number of analog signals and control a number of analog operating devices, the primary function of programmable controllers has been to monitor large numbers of single-bit digital devices, such as limit switches, and control a large number of single-bit operating devices such as solenoids and motor starters. As a result, the processor, or central logic unit of a programmable controller is typically less complex, less powerful and less costly than the processor of a general purpose computer. On the other hand, special purpose program loaders such as those disclosed in U.S. Pat. Nos. 3,798,612 and 3,813,649 have been developed to facilitate the development and editing of control programs in programmable controllers. These program loaders allow control engineers with little programming training or experience to develop complex control programs for programmable controllers. Once perceived as a substitute for hardwired logic controllers and relay control panels, the programmable controller has grown in size and capability to where it is now also perceived as a substitute for process controllers in many applications.

Programmable controller processors are designed to rapidly execute programmable controller instructions in a control program. The length of the control program, and hence the complexity of the system being controlled, has heretofore been limited to insure that the entire program can be executed, or scanned, within a set time. Such time limits are required to insure that the programmable controller will provide virtually instantaneous response to any change in the status of sensing devices on the controlled system.

There are numerous applications which would require such lengthy control programs that programmable controllers are not presently competitive with process controllers. It has been observed, however, that many of these applications require a few basic control functions which are repeated, but with different parameters. In a test stand for automobile engines, for example, the engines are cycled through a series of steps which are intended to evaluate their performance. These steps may remain the same for all models, but the test parameters may differ. A programmable controller program which will operate such a test stand has in the past included sets of essentially the same controller instructions, one set for each model to be tested. These repeated sets of controller instructions require considerable memory space, and in programmable controllers which do not have "jump" capability, each set must be executed during each scan through the control program.

SUMMARY OF THE INVENTION

The present invention relates to a data handling module which is coupled to the memory of a programmable controller and which is operable to transfer data between an active data file and a data file storage. The active data file is located at preselected memory locations which are accessible by the controller processor in response to controller instructions in the control program. The function performed by a set of controller instructions can thus be altered by exchanging the data in the active data file with other data in the data file storage.

Another aspect of the invention is the transfer of data in the controller memory without appreciably affecting the operation of the controller processor. The data handling module is a separate processor which periodically "steals" a memory cycle from the controller processor to carry out its functions. The operation of the data handling module is coordinated with the programmable controller by a control status register which stores flags that direct the data handling module to perform selected functions and flags which indicate to the programmable controller the status of the data handling module. The control status register may be examined with controller instructions in the control program and set with other controller instructions to a desired state. The user, by means of the control program which he develops, may thus control the operation of the data handling module even though it operates independently of the controller processor.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
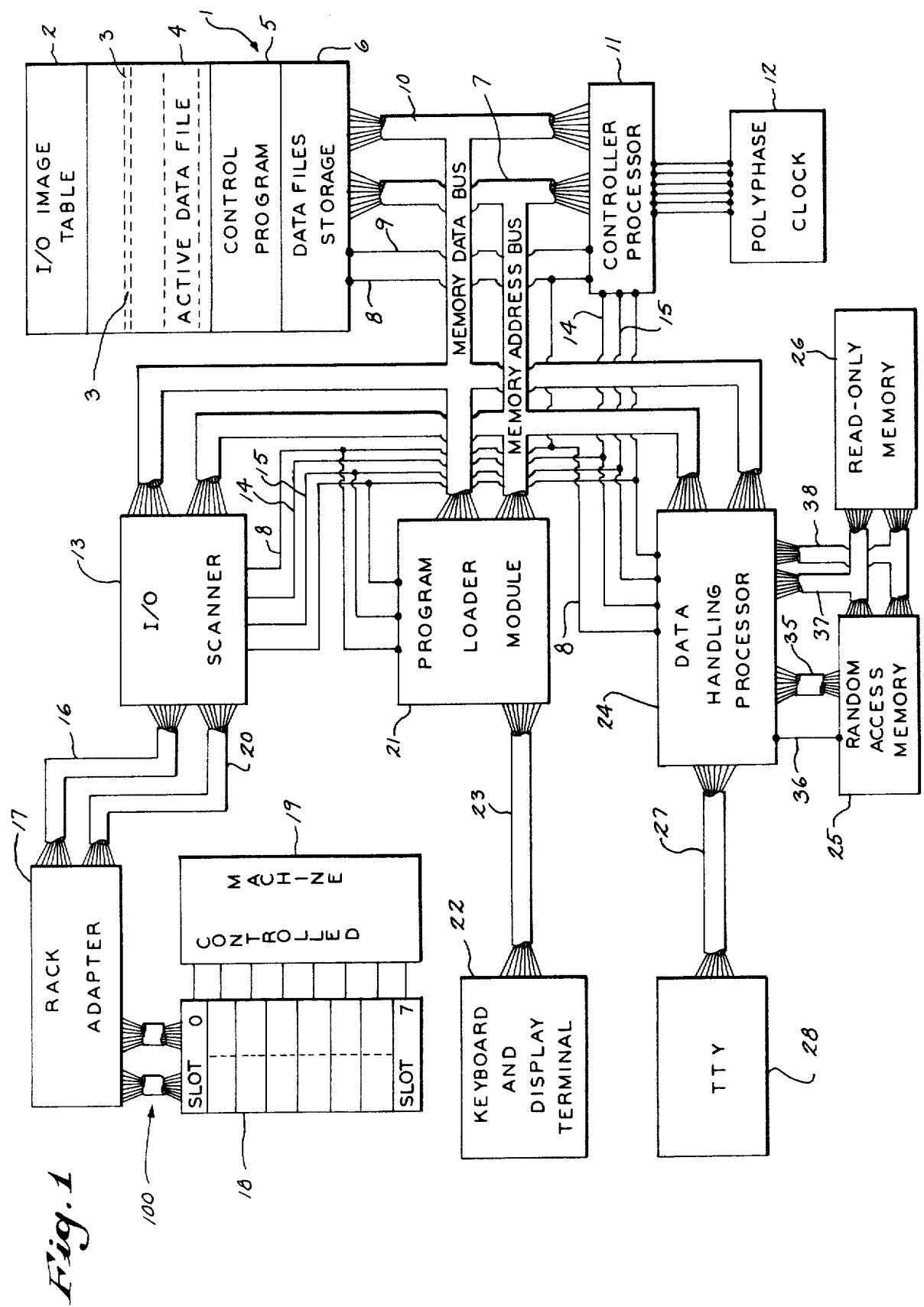
FIG. 1 is an electrical schematic diagram of a programmable controller which employs the data handling module of the present invention.

Referring particularly to FIG. 1, the programmable controller includes a random access read/write memory 1 which has an eighteen-bit word length and which includes from 2,048 to 8,192 separately addressable lines depending upon the size of the control program which it is to store. Two bits in each word stored in the memory 1 are used for parity checking, and thus, sixteen data bits are stored on each line of the memory 1. An output image table is stored on the first sixty-four lines of the memory 1 and each line is separately addressable with the octal addresses 000-077. An input image table is stored on the next sixty-four lines of the memory 1 and each line is separately addressable with the octal addresses 100-177. Together, the first 128 lines of the memory 1 form an I/O image table 2. Preset and accumulated values of counters and timers are stored next in the memory 1 along with two lines at octal addresses 276 and 277 which comprise a control status register 3, and forty-five lines at octal addresses 720-774 which comprise an active data file 4. A control program 5 comprised of controller instructions is stored at octal memory locations one thousand and higher and a data file storage 6 is stored thereafter. The size of the control program 5 varies in each system and the boundary between it and data file storage 6 is, therefore, not fixed. An end of program word (END) defines the boundary and resets the program counter (not shown in the drawings) to the octal address one thousand to commence the next scan of the control program 5.

Selected data is read from the memory 1 by applying the proper octal address to a memory address bus 7 and applying a logic low voltage to a read/write line 8. The memory 1 is cycled by applying a logic high pulse to a memory cycle line 9 and the addressed word is read out on a memory data bus 10. A word is loaded, or written into a selected line of the memory 1 by applying the octal address of that line to the memory address bus 7, applying a logic high voltage to the read/write line 8 and applying a logic high voltage pulse to the memory cycle line 9. The sixteen-bit data word appearing on the memory data bus 10 during the one-microsecond cycle time of the memory 1 is written into the selected line of the memory 1.

The control program 5 is executed by a controller processor 11 which connects to the memory buses 7 and 10 and to the control lines 8 and 9. In response to one-megahertz clock pulses generated by a polyphase clock 12, the controller processor 10 continuously and sequentially reads out the instructions of the control program 5 from the memory 1, and in response to an operation code contained within each program instruction, it performs the operations necessary to carry out the controller functions. Such operations include, for example, examining a status bit in the I/O image table 2 or setting a status bit in the I/O image table 2 to a desired state.

Each status bit in the output portion of the I/O image table 2 may correspond with an operating device such as a motor starter or solenoid on a system being controlled, and each status bit in the input portion of the I/O image table 2 may correspond with a sensing device such as a limit switch or a photoelectric cell on the controlled system. This correspondence is achieved by connecting all of the sensing and operating devices on the system being controlled to separately addressable input and output circuits on I/O interface racks, one of which is indicated at 100. Each status bit of the I/O image table 2 is periodically updated by coupling the status of the corresponding sensing device or operating device on the controlled system with the memory 1. This function is performed by an I/O scanner circuit 13 which connects with the processor 11 through an interrupt line 14 and a grant line 15 and which connects directly to the memory data bus 10, the memory address bus 7, and the read/write line 8. The scanner circuit 13 periodically couples the memory data bus 10 to an I/O data bus 16 which connects to a rack adapter 17 on each of the I/O interface racks 100. The rack adapter 17 connects to eight separately addressable I/O slots 18, each of which may include sixteen addressable input or output circuits that connect to the operating and sensing devices on the controlled machine 19. An I/O slot may also include word oriented modules such as those disclosed in copending U.S. Patent application Ser. No. 696,138 entitled "Asynchronous Coupling of Data Between a Word-Oriented I/O Module and the Memory of a Programmable Controller". An I/O address bus 20 connects the rack adapter 17 to the scanner circuit 13, and each rack adapter 17 includes decoding circuitry which is responsive to three bits in the six-bit address code on the bus 20 to enable the I/O interface rack 100 when its rack number is detected. Each rack adapter 17 also includes decoding circuitry which is operable to enable one of the slots 0-7 in response to the three remaining bits on the I/O address bus 20.

The I/O scanner circuit 13 periodically "steals" a memory cycle from the processor 11 to read a sixteen-bit word in the output portion of the I/O image table 2 of the memory 1 and couple that word through the I/O data bus 16 to a selected rack and slot which is identified by an address on the I/O address bus 20. Also, the scanner circuit 13 periodically reads the status of the sixteen bits in an addressed slot and couples the sixteen-bit data word to an addressed line in the input portion of the I/O image table 2 in the memory 1. Thus, by periodically stealing a memory cycle from the processor 11, the I/O scanner circuit 13 updates the input portion of the I/O image table 2 with the current status of the sensing devices on the controlled machine 19, and periodically updates the state of the operating devices on the controlled machine 19 by coupling the current status of the output portion of the I/O image table 2 to the proper rack adapter 17.

A controller program loader interacts with the controller processor 11 and the read/write memory 1 on a similar "cycle steal" basis. The controller program loader includes a program loader module 21 which connects to the memory address bus 7, the memory data bus 10, the interrupt line 14 and the grant line 15. The program loader module 21 operates in response to programs stored in its read-only memory (not shown in the drawings) to load a control program into the controller read/write memory 1 and to perform a number of editing functions on it. The control program instructions are entered through a keyboard that forms part of a keyboard and display terminal 22 which connects to the program loader module 21 through a cable 23. For a more detailed description of the program loader module 21 and keyboard and display terminal 22 reference is made to copending U.S. Pat. No. 4,070,702 which issued Jan. 24, 1978 and is entitled "Contact Histogram for Programmable Controller".

The data handling module of the present invention also couples to the read/write memory 1 and periodically steals a memory cycle from the processor 11 to carry out its functions. The data handling module includes a data handling processor 24, a random access memory (RAM) 25 and a read-only memory 26. The data handling processor connects to the memory address bus 7, the memory data bus 10, the read/write control line 8, the interrupt line 14 and the grant line 15. As will become apparent from the description to follow, the data handling processor 24 reads selected words out of the read/write memory 1 and writes them back into the memory 1 at different locations. Words read out of the memory 1 may also be coupled through a cable 27 to a TTY 28.

Figure 2:
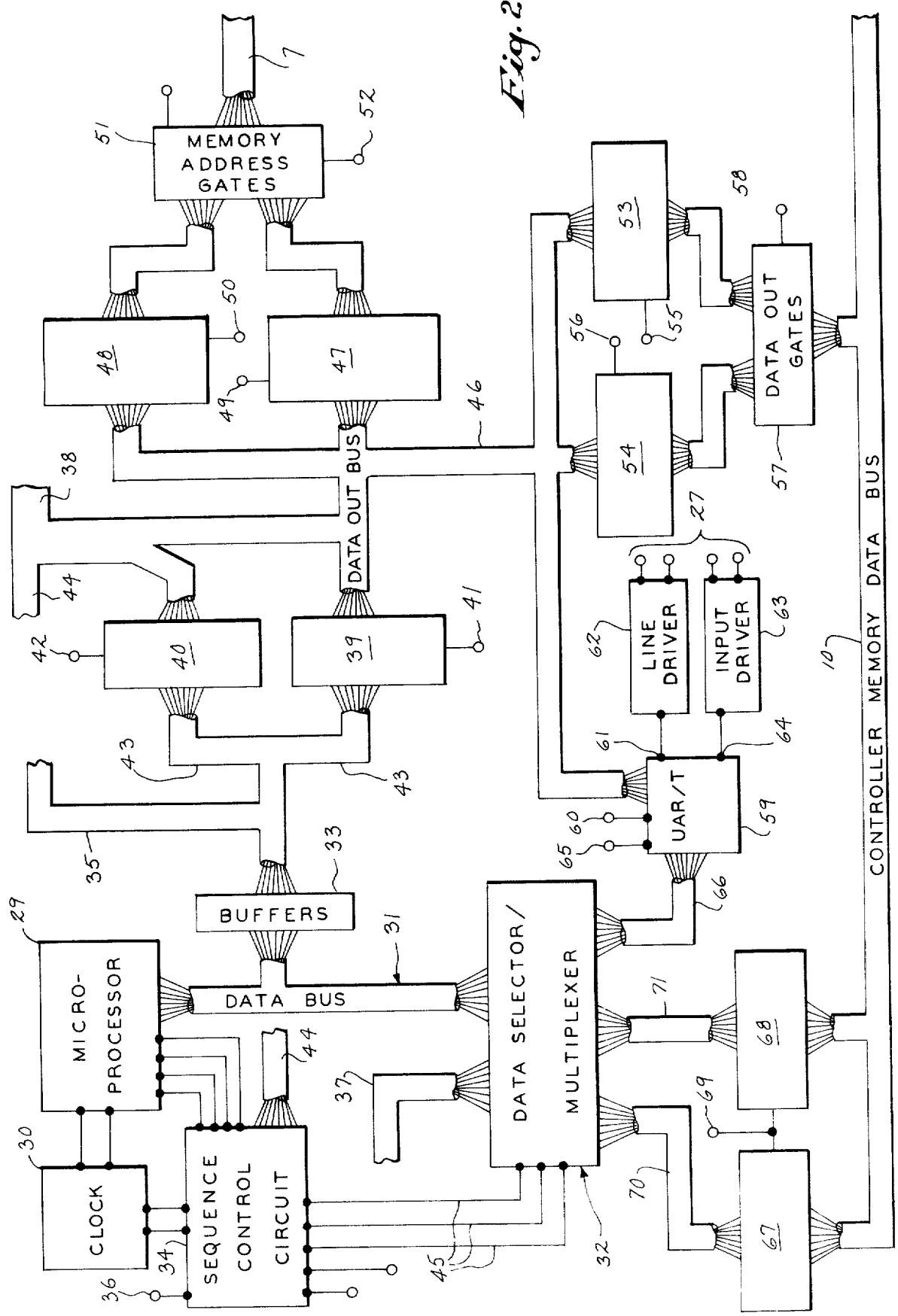
FIG. 2 is an electrical schematic diagram of the data handling processor which forms part of the system of FIG. 1.

Referring particularly to FIGS. 1 and 2, the data handling processor 24 includes an eight-bit microprocessor 29 such as that sold commercially by the Intel Corporation as Model 8008. The microprocessor 29 is driven by a 500 khz. two-phase clock 30 and is connected through an eight-bit data bus 31 to a number of input and output ports. The input ports are coupled to the data bus 31 by an eight-port data selector/multiplexer 32 which is formed by sixteen parallel connected commercially available 4-line-to-1-line data selectors. The data bus 31 is coupled to the output ports through a set of eight buffers 33.

Figure 4:
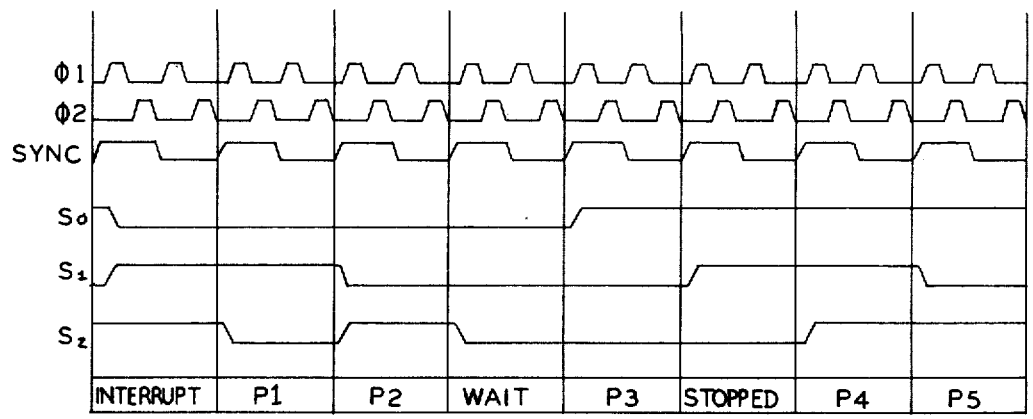
FIG. 4 is a graphic illustration of control signals which appear in the control circuit of FIG. 3.
Figure 5:
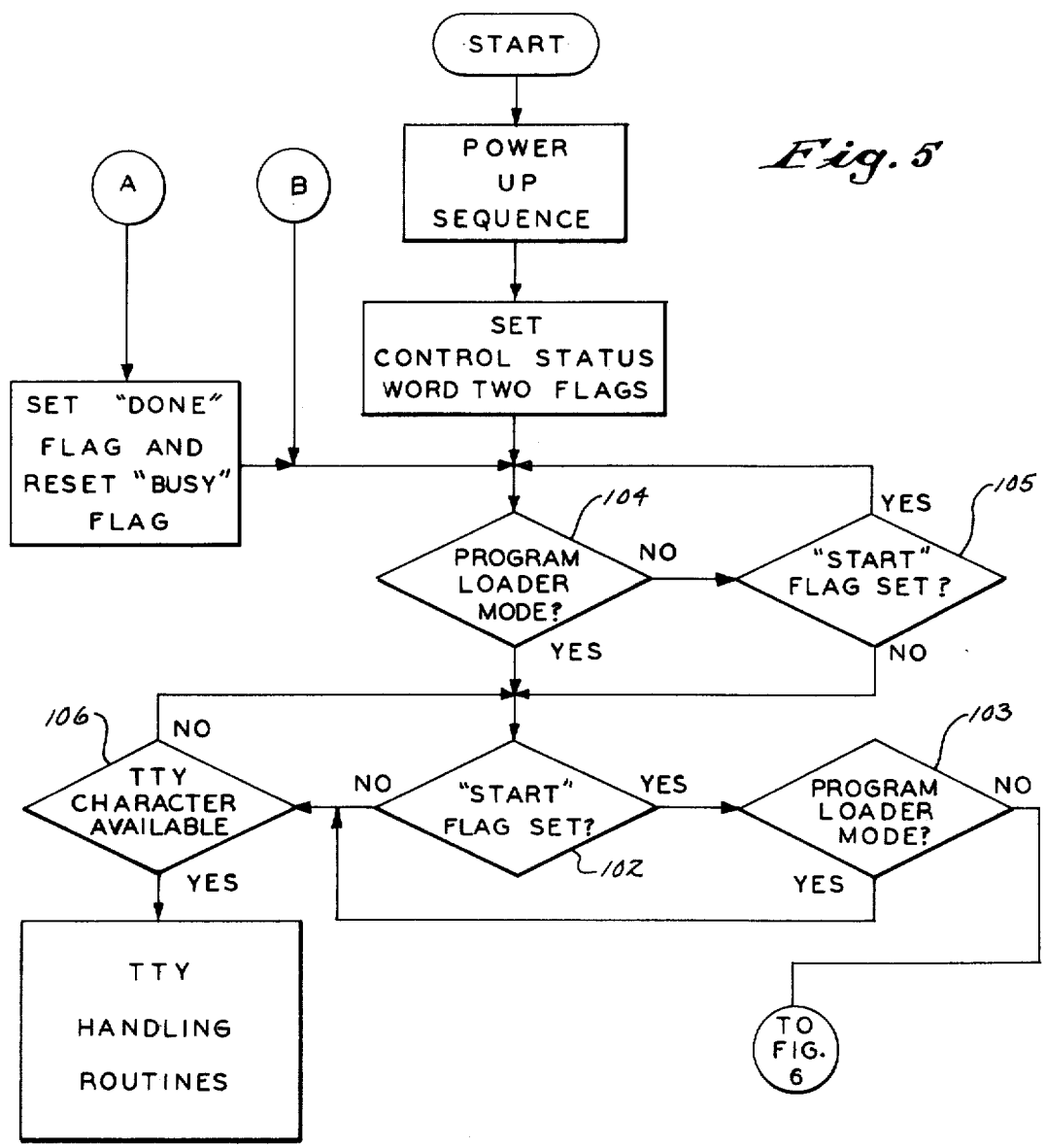
FIG. 5 is a flow chart of an executive routine which is stored in a read-only memory which forms part of the system of FIG. 1.

The microprocessor 29 controls the use of the data bus 31 and determines whether it will be conducting input or output data. As shown in FIG. 4, processor state signals $S_0$, $S_1$ and $S_2$, along with a timing signal, SYNC, inform the supporting circuitry of the state of the microprocessor 29. A table of the binary state signals and the designated state names is as follows:

| MICROPROCESSOR | | | |
|---|---|---|---|
| $S_0$ | $S_1$ | $S_2$ | STATE |
| 0 | 1 | 0 | P1 |
| 0 | 1 | 1 | INTERRUPT |
| 0 | 0 | 1 | P2 |
| 0 | 0 | 0 | WAIT |
| 1 | 0 | 0 | P3 |
| 1 | 1 | 0 | STOPPED |
| 1 | 1 | 1 | P4 |
| 1 | 0 | 1 | P5 |

These state signals and the SYNC signal are applied to a sequence control circuit 34 which operates the supporting circuitry now to be described. For a more detailed description of the microprocessor 29, including its capabilities, the manner in which it operates and the manner in which it interrelates with the supporting circuitry, reference is made to "8008 8 Bit Parallel Central Processor Unit Users Manual", published by the Intel Corporation on November, 1973.

Referring particularly to FIGS. 1 and 2, the buffers 33 connect to the random access memory (RAM) 25 through an eight-bit memory data out cable 35. The RAM 25 supplements the storage registers contained within the microprocessor 29 and is comprised of eight sixty-four bit memory chips arranged to store sixty-four separately addressable eight-bit words. An addressed word is read from the RAM 25 when a logic high voltage is applied to a read/write line 36 and a word is written into an addressed line when a logic low is applied to the line 36. Data read out of the RAM 25 is coupled through a memory data in cable 37 which connects to one of the eight-bit input ports on the multiplexer 32.

The memory data in cable 37 also connects to the read-only memory 26 to convey eight-bit data words read therefrom. The read-only memory 26 is comprised of thirty-eight ultraviolet light erasable programmable read-only memory chips (proms) such as Serial No. 1702 sold commercially by the Intel Corporation. The read-only memory 26 provides storage for 9,728 eight-bit words. The memory 26 stores the control program for the data handling module.

The memory lines in both the RAM 25 and the read-only memory 26 are separately addressable through a memory address cable 38. The eight least significant digit leads in the memory address cable 38 connect to the outputs of an eight-bit data latch 39 and the six most significant digit leads connect to six outputs on a second eight-bit data latch 40. The data latches 39 and 40 are each comprised of eight D-type flip-flops having their clock terminals commonly connected to respective clock lines 41 and 42 and their D inputs connected to respective outputs of the buffers 33 through a cable 43. The clock lines 41 and 42 connect to the sequence control circuit 34, and when a logic high is applied to either of them an eight-bit word on the cable 43 is stored in the respective data latch 39 or 40.

The output terminals on the data latches 39 and 40 also connect to the sequence control circuit 34 through a cable 44. A code generated on the cable 44 indicates the function which is to be performed by the microprocessor supporting circuitry. For example, this code determines how the read/write line is to be controlled by the sequence control circuit 34, and it determines which input port is to be selected by operating the data selector 32 through three leads 45.

Connected to the eight output terminals on the data latch 39 is an eight-lead data out bus 46 which couples data from the microprocessor 29 to the controller memory address bus 7, the controller memory data bus 10, or the TTY 28. More specifically, the data out bus 46 connects to eight input terminals on a first eight-bit controller address latch 47 and to the eight input terminals on a second eight-bit controller address latch 48. The latches 47 and 48 are each comprised of eight D-type flip-flops having their clock terminals commonly connected to the sequence control circuit 34 through respective leads 49 and 50. The Q output of each flip-flop in the address latches 47 and 48 connects to respective input terminals on fifteen memory address gates and one read/write gate 51. The gates 51 are NAND gates each having one input connected to a latch 47 and 48 and a second input commonly connected to the sequence control circuit 34 through an enable line 52. The output on each of fifteen of the NAND gates 51 connects to a lead in the controller memory address bus 7 and the output of the sixteenth NAND gate 51 connects to the controller read/write line 8.

The data out bus 46 also connects to the eight input terminals on a first controller data latch 53 and to eight input terminals on a second controller data latch 54.

Each data latch 53 and 54 is comprised of eight D-type flip-flops having their clock terminals commonly connected to the sequence control circuit 34 through clock leads 55 and 56 and their Q outputs connected to respective inputs on sixteen data out gates 57. The data out gates 57 are NAND gates each having a second input commonly connected to the sequence control circuit 34 through an enable line 58 and an output terminal connected to respective leads in the controller memory data bus 10.

And finally, the data out bus 46 connects to eight parallel data input terminals on a universal asynchronous receiver/transmitter (UAR/T) 59. The UAR/T 59 is a commercially available circuit such as the AY-5-1013 manufactured by the Microelectronics Division of The General Instrument Corporation which receives and stores the eight bits on the data out bus 46 when a logic high voltage is applied to a transmit strobe line 60. The strobe line 60 connects to the sequence control circuit 34 and when it is driven high, the eight bits of data on the bus 46 are transmitted serially through an output terminal 61 to a line driver 62. The line driver amplifies the digital output data to a form suitable for transmission on the cable 27 to the TTY 28.

The UAR/T 59 also receives eight-bit bytes of serial data from the TTY 28 through an input circuit 63 which connects to a serial data in terminal 64. The input circuit provides optical isolation and converts the digital signals received on the cable 27 to a logic level. When a logic high voltage appears on a receive line 65, the UAR/T 59 couples the eight-bit byte of serially received data to the data selector 32 through a cable 66.

The data selector/multiplexer 32 also receives data from the controller memory data bus 10 through two eight-bit input ports. A pair of eight-bit input data latches 67 and 68, each comprised of eight D-type flip-flops, connect to the sixteen leads in the controller memory data bus 10. The clock terminals on each flip-flop are commonly connected to the sequence control circuit 34 through a clock lead 69, and when a logic high voltage is applied thereto, a sixteen-bit data word is stored in the latches 67 and 68 and appears at the sixteen Q outputs. The eight Q outputs of the input data latch 67 are connected through an eight-lead bus 70 to one input port on the multiplexer 32 and the eight Q outputs on the input data latch 68 connect to a second input port through a bus 71.

Figure 3:
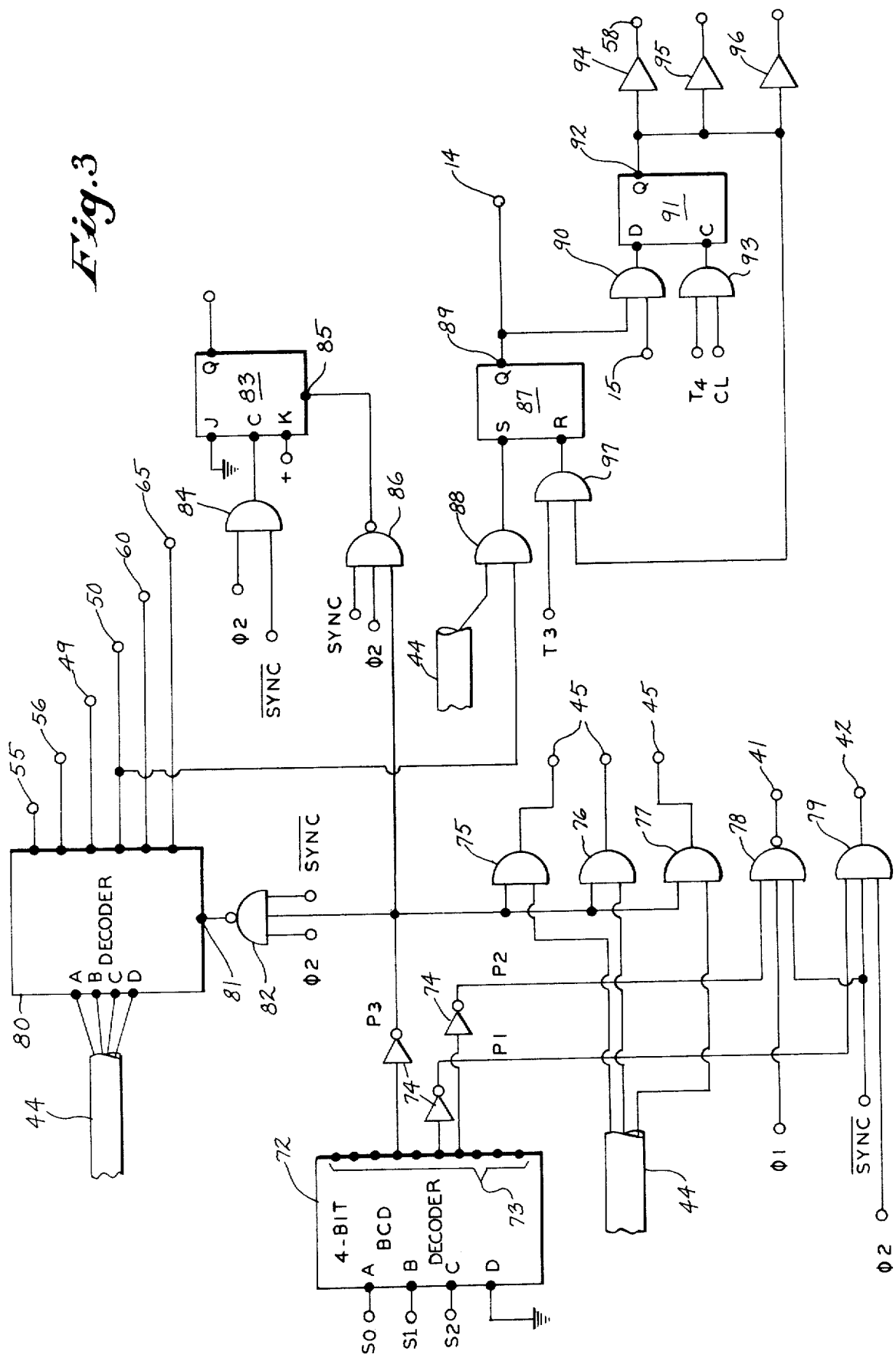
FIG. 3 is an electrical schematic diagram of the sequence control circuit which forms part of the processor of FIG. 2.

The S0, S1, S2 and SYNC signals generated by the microprocessor 29 along with the $\phi 1$ and $\phi 2$ signals generated by the clock 30 operate the sequence control circuit 34 to control the supporting circuitry. Referring particularly to the circuit diagram of the sequence control circuit 34 in FIG. 3, the S0, S1 and S2 signals are received at the $a$–$c$ inputs of a four-bit BCD decoder 72. The BCD decoder 72 is a commercially available integrated circuit having its D input connected to signal ground and having a set of ten output terminals 73. A logic low voltage is generated at the fourth output terminal 73 during the P3 time period, at the sixth output terminal 73 during the P1 time period, and at the seventh output terminal 73 during the P2 time period. The outputs 73 couple through inverter gates 74 to generate logic high timing signals. The P3 timing signal is applied to one input on a first AND gate 75, to one input on a second AND gate 76 and to one input on a third AND gate 77. A second input on the AND gate 75 connects to receive the tenth digit from the data latch 40 through the cable 44, a second input on the AND gate 76 connects to receive the eleventh digit and a second input on the AND gate 77 connects to receive the twelfth digit. The outputs of the AND gates 75, 76 and 77 control the data selector/multiplexer 32 through the leads 45 by generating a three-bit binary coded number thereon which selects one of the eight input ports during the P3 time period.

The P2 timing signal terminal 73 connects to one input on a NAND gate 78. A second input on the NAND gate 78 connects to receive the $\phi 1$ timing signal from the clock 30 and a third input thereon connects to receive the SYNC timing signal from the microprocessor 29. Its output terminal controls the data latch 39 through the lead 41. The P1 timing signal terminal 73 connects to one input on an AND gate 79, a second input on the AND gate 79 connects to receive the $\phi 2$ timing signal and a third input thereon connects to receive the SYNC timing signal. The output of the AND gate 79 controls the data latch 40 through the lead 42.

Th controller data latches 53 and 54, the address latches 47 and 48, and the UAR/T 59 are controlled by a four-line-to-sixteen-line decoder 80. The decoder 80 is a commercially available integrated circuit having a set of inputs A–D connected respectively to receive the tenth, eleventh, twelfth and thirteenth digits through the cable 44. The decoder includes a set of sixteen output terminals, the first six of which connect to the respective leads 55, 56, 49, 50, 60 and 65 to control the above listed circuit elements. In response to the four-bit operation code applied to its inputs A–D, the decoder generates a logic low voltage at one of its sixteen output terminals when a logic low voltage is applied to a clock terminal 81. The clock terminal 81 is driven by a NAND gate 82 which has one input connected to receive the P3 timing signal, a second input connected to receive the $\phi 2$ timing signal, and a third input connected to receive the SYNC timing signal.

The read/write line 36 which controls the RAM 25 is driven by a J-K flip-flop 83. The J input on the flip-flop 83 is driven by an AND gate 84. One input on the AND gate 84 connects to receive the $\phi 2$ timing signal, and a second input thereon connects to receive the SYNC timing signal. A preset input terminal 85 on the J-K flip-flop 83 connects to the output of a NAND gate 86. One input on the NAND gate 86 connects to receive the P3 timing signal, a second input connects to receive the $\phi 2$ timing signal and a third input connects to receive the SYNC timing signal. In response to the logic state of these signals, the flip-flop 83 is set or reset during the P3 timing period to either read a word from the RAM 25 or write a word into it.

Direct access to the memory 1 of the programmable controller is initiated after a memory address has been loaded into the address latches 47 and 48. More specifically, an R-S flip-flop 87 has its set input connected to the output of an AND gate 88, which in turn has one input connected to receive the seventh digit in the cable 44 and a second input connected to the control line 50 which leads to the second address latch 48. The flip-flop 87 is set when an interrupt is to be requested and a logic high voltage is generated at its Q output 89 which connects to the controller interrupt line 14. The Q output 89 also connects to one input on an AND gate 90 which drives the D input on a D-type flip-flop 91. A second input on the AND gate 90 connects to the controller grant line 15 and when the interrupt is granted, the flip-flop 91 is set to generate a logic high voltage at its Q output terminal 92. The flip-flop 91 is clocked by T4 and C1 timing signals which are received from the programmable controller and applied to the C input through an AND gate 93. The resulting logic high generated at the Q output 92 during the one-microsecond interrupt is applied through buffers 94, 95 and 96 to the respective lines 58, 52 and 69 which control the data out gates 57, the memory address gates 51, and the input data latches 67 and 68. This logic high voltage is also coupled through an AND gate 97 to the reset terminal on the R-S flip-flop 87. The AND gate 97 is enabled by a T3 timing signal received from the programmable controller. For a more detailed description of the manner in which the one-microsecond interrupt is granted and terminated, reference is made to the above cited U.S. Pat. No. 3,942158.

The function to be performed by the microprocessor's supporting circuitry is thus determined by instructions which are read out of the microprocessor 29 and stored in the data latches 39 and 40. Those instructions which relate to the data handling module functions are as follows:

| | Input Instructions | |
|---|---|---|
| Mnemonic | Bit Pattern | Comment |
| INP MEM | 01000001 | Read data from memories 25 and 26. |
| INP RECEV | 01000011 | Input data from UAR/T 59. |
| INP PLCLI | 01000101 | Input data from latch 67. |
| INP PLCLH | 01000111 | Input data from latch 68. |
| INP SUART | 01001111 | Received data present at UAR/T 59. |

| | Output Instructions | |
|---|---|---|
| Mnemonic | Bit Pattern | Comment |
| OUT PLCL0 | 01010001 | Load data in latch 53. |
| OUT PLCHO | 01010011 | Load data in latch 54. |
| OUT PLCLA | 01010101 | Load address in latch 47. |
| OUT PLCHA | 01010110 | Load address in latch 48. |
| OUT TRANS | 01011001 | TRANSMIT data from UAR/T 59. |
| OUT CLRDA | 01011011 | Acknowledge received data from UAR/T 59. |

As indicated previously, these instructions and the other instructions which comprise the data handling module routines are stored in the read-only memory 26. The microprocessor 29 reads these instructions out of the memory 26 in the proper sequence and executes them. These routines will be described hereinafter with reference to the flow charts shown in FIGS. 5–9.

Before discussing in detail the functions performed by the data handling processor 24 and the manner in which it operates to carry them out, a further description of the operation of the programmable controller to which it is attached will be made.

Referring again to FIG. 1, there are three general types of program instructions executed by the programmable controller processor 11. A program instruction which calls for an operation involving a selected bit in either the output portion or input portion of the image table 2, the control status register 3, or the active data file 4 includes an eight-bit operand address which indicates the memory address of the word containing the desired bit and a four-bit pointer that identifies which of the sixteen bits in the addressed word is selected. Such program instructions are referred to hereinafter as bit instructions and they include the following:

TABLE I

| OPERATION | OP CODE | | | | POINTER | | | | OPERAND ADDRESS | Execution Time |
|---|---|---|---|---|---|---|---|---|---|---|
| XIC/XOE | 0 | 0 | 1 | 0 | P | P | P | P | A A A A A A A A | 2 usec. |
| XIO/XOD | 0 | 0 | 1 | 1 | P | P | P | P | A A A A A A A A | |
| OTU | 1 | 1 | 0 | 0 | P | P | P | P | A A A A A A A A | |
| OTL | 1 | 1 | 0 | 1 | P | P | P | P | A A A A A A A A | |
| OTD | 1 | 1 | 1 | 0 | P | P | P | P | A A A A A A A A | 3 usec. |
| OTE | 1 | 1 | 1 | 1 | P | P | P | P | A A A A A A A A | |
| INSTRUCTION BIT NUMBER (OCTAL) | 17 | 16 | 15 | 14 | 13 | 12 | 11 | 10 | 7 6 5 4 3 2 1 0 | |

The mnemonic operation codes for the bit instructions are briefly defined as follows:

XIC — Examine bit closed or, is the bit in a logic 1 state?

XOE — Same as XIC, but refers to a bit in the output portion of image table.

XIO — Examine bit open or, is the bit in a logic 0 state?

XOD — Same as XIO, but refers to a bit in the output portion of the image table.

OTU — If conditions are true latch bit off, or to a logic 0 state, and if false do nothing.

OTL — If conditions are true latch bit on, or to a logic 1 state, and if false do nothing.

OTD — If conditions are true turn bit off and if conditions are false turn bit on.

OTE — If conditions are true turn bit on and if conditions are false turn bit off.

A second general type of program instruction is executed by the controller processor 11 to perform either a control or logical function. Such instructions are referred to hereinafter as control instructions and are comprised solely of an operation code. They include the following:

TABLE II

| OPERATION | OPERATION CODE | | | | | | | | | Execution Time |
|---|---|---|---|---|---|---|---|---|---|---|
| NOP | 0 0 0 0 | 0 | 0 | 0 | 0 | 0 0 0 0 0 0 0 0 | | | | |
| BND | 0 0 0 0 | 1 | 1 | 1 | 1 | 1 1 1 1 1 1 1 1 | | | | |
| BST | 0 0 0 1 | 1 | 1 | 1 | 1 | 1 1 1 1 1 1 1 1 | | | | 1 usec. |
| END | 0 0 1 1 | 1 | 1 | 1 | 1 | 1 1 1 1 1 1 1 1 | | | | |
| NOP 1 | 1 1 1 1 | 1 | 1 | 1 | 1 | 1 1 1 1 1 1 1 1 | | | | |
| INSTRUCTION BIT NUMBER (OCTAL) | 17 16 15 14 | 13 | 12 | 11 | 10 | 7 6 5 4 3 2 1 0 | | | | |

The mnemonic operation codes for the control instructions are briefly defined as follows:

NOP — No operation (all bits zero)

BND — Branch end: termination of a Boolean branch

BST — Branch start: opens or begins a Boolean sub-branch

END — End of the control program

NOP — No operation (all bits one)

A third general type of control program instruction is executed by the controller processor 11 to operate on a data word stored in the memory 1. These instructions are referred to hereinafter as transfer and arithmetic instructions and are characterized by an operand address which indicates the address of a word in the memory 1. These instructions are particularly pertinent to the present invention in that they transfer sixteen-bit words between the memory 1 and the controller processor 11 and perform operations on them.

OTL(16)775$_8$; If preceding condition is true set bit number sixteen at memory location 775 (octal) to a logic 1.

XIC(16)775$_8$; Is bit number sixteen at memory location 775 (octal) in a logic 1 state?

GET 111$_8$; Fetch word at I/O image table memory location 111 (octal) and store in processor data accumulator.

LES 726$_8$; Is the value stored in the processor data accumulator less than the value stored at active data file memory location 726 (octal)?

OTL 012(16); If preceding conditions are true set bit number sixteen in I/O image table memory line 12 (octal) to a logic 1 state.

TABLE III

| OPERATION | OPERATION CODE | | | | | | | OPERAND ADDRESS | Execution Time |
|---|---|---|---|---|---|---|---|---|---|
| PUT | 0 | 1 | 0 | 0 | X | 0 | 1 | X | |
| GET | 1 | 0 | 0 | 0 | X | 0 | 1 | X | 2 usec. |
| EQU | 1 | 0 | 1 | 0 | X | 0 | 1 | X | |
| LES | 1 | 0 | 1 | 1 | X | 0 | 1 | X | |
| INSTRUCTION BIT NUMBER (OCTAL) | 17 | 16 | 15 | 14 | 13 | 12 | 11 | 10 | 7 6 5 4 3 2 1 0 |

The mnemonic operation codes for the above arithmetic instructions are briefly defined as follows:

PUT — If conditions are true write the number stored in the processor data accumulator in the selected memory line, otherwise, do nothing.

GET — Fetch the word on the selected memory line and store in the processor data accumulator.

EQU — Is the value stored in the processor data accumulator equal to the value stored on the selected memory line?

LES — Is the value stored in the processor data accumulator less than the value stored on the selected memory line?

Reference is made to the above cited patent entitled "Programmable Logic Controller" for a more complete description of the structure of the controller processor 11 and the manner in which it functions to execute each of the above types of program instructions.

The control program 5 stored in the memory 1 is comprised of a sequence of the above type controller instructions which have been entered by the user via the program loader module 21. These controller instructions are executed in sequence by the controller processor 11 and when the end of program instruction (END) is executed, the processor program counter (not shown in the drawings) is reset to commence executing the control program again. The control program 5 is thus repeatedly executed, or scanned, and it is a major objective in this art to maintain this scan time at a minimum. A scan time of less than twenty milliseconds is desired in most industrial applications.

The manner in which the processor 11 operates in conjunction with the data handling module can best be explained by way of an example. A control program for an engine test stand connected to I/O interface rack 100 may include the following controller instructions which are executed at least once every twenty milliseconds.

GET 110$_8$; Fetch word at I/O image table memory location 110 (octal) and store in processor data accumulator.

EQU 725$_8$; Is the value stored in the processor data accumulator equal to the value stored in active data file memory location 725 (octal)?

In the example, slot zero of interface rack number 100 is an analog input module connected to sense engine speed, slot one is an analog input module connected to sense engine oil pressure, and bit sixteen in slot three operates an alarm which indicates low oil pressure. Line 725 (octal) of the active data file contains a three-digit number which indicates a specified engine speed at which the oil pressure is to be measured and line 726 (octal) is a three-digit number which indicates the minimum allowable oil pressure at that engine speed. The above portion of a much more extensive control program for testing the performance of the engine thus checks oil pressure every time the engine reaches a specified speed. If the oil pressure is too low, the alarm is sounded.

If different types of models of engines are to be tested, it is likely that the speed at which oil pressure is to be checked and/or the minimum allowable oil pressure will be different for each. Rather than repeating the above set of controller instructions for each possible type or model of engine to be tested, the same set of controller instructions can be used for all of them merely by substituting the data in the active data file 4 with an appropriate data file in the storage 6.

Among other functions, the data handling module of the present invention performs this substitution. The control program 5 includes controller instructions which first identify the type or model of engine under test and then call on the data handling module to transfer into the active data file 4 the test parameters applicable to that engine. The above set of controller instructions along with others are then executed to run the engine through a series of tests appropriate to it. When the testing is completed the next engine is identified and the data file appropriate to it is transferred from the storage 6 to the active data file 4. The same controller program 5 is then executed with the new set of tests parameters. It can be appreciated that in some installations substantial memory space can be saved by eliminating repetition of portions of the control program and the scan time of the resulting shorter control program 5 may be substantially less. In addition, since the control program is substantially shorter, less time is required in both programming and debugging.

Communication between the programmable controller and the data handling module is accomplished through the control status register 3. The register 3 is comprised of two memory lines (address 276 and 277 octal) which store the following information:

| Control Status Word One | | | | |
|---|---|---|---|---|
| 16 | 15 | 14 | 13 | 12 11 10 9 8 7 6 5 4 3 2 1 |
| START DATA TRANS- FER | CLEAR DATA FILE | DIREC- TION OF TRANS- FER | DATA OR MES- SAGE | Three Decimal Digit Data File Number |

| Control Status Word Two | | | | | | | |
|---|---|---|---|---|---|---|---|
| 16 | 15 | 14 | 13 | 12 | 11 | 10 | 9 8 7 6 5 4 3 2 1 |
| Mod- ule Done | Mod- ule Busy | Data File Stor- age Full | Data File Not Found | Data File Exis- ting | | Po- wer Re- start | NOT USED |

Control status word one indicates to the data handling module what function is to be performed and what data file is involved. The content of this word is determined by the control program 5. Bits one through twelve store a three-decimal digit number which identifies the data file to be operated upon, bit thirteen indicates whether that file contains data or a message which is to be coupled to the TTY 28, and bit fifteen indicates that the identified data file is to be cleared from the storage 6. Bit fourteen indicates whether data is to be transferred from the storage 6 to the active data file 4 or from the active data file 4 to the data file storage 6. Bit sixteen initiates the data transfer when it is set to a logic 1 state.

Control status word two indicates to the programmable controller the present status of the data handling module. Bit fifteen indicates that the data handling module is busy performing a function, and bit sixteen indicates when that function has been completed. Bit fourteen indicates that there is no space in the storage 6 in which to transfer a data file, bit thirteen indicates that the data file identified in control status word one cannot be found in the data file storage 6, and bit twelve indicates that the data file identified in control status word one is an existing data file in the storage 6. Bit ten is set to a logic 1 state whenever power is reapplied to the system and the data handling module was performing a function at the time of power outage.

The control program 5 contains controller instructions which examine the contents of the control status register 3 and controller instructions which set the state of control status word one. By the use of such controller instructions the user may call upon the data handling module to perform its data transfer functions. In the above example for an engine test stand such controller instructions may be as follows:

XIC 013(14); Is bit number fourteen in slot 3 of interface rack number one set to a logic 1 state?

GET 776₈; Fetch the word at memory location 776 (octal) and store in processor data accumulator.

PUT 276₈; If preceding conditions are true write the contents of processor data accumulator into control status register one.

Bit number fourteen in slot 3 of interface rack one indicates when a model X engine has been placed in the test stand. The word stored at memory location 276 (octal) includes the three-decimal digit data file number for engine model X along with a logic 1 in bits 13, 14 and 16 which indicate that the data handling module is to start a data transfer to the active data file 4. The controller processor 11 continues to execute controller instructions while the data handling module carries out the requested data transfer. When the transfer is completed as will be described in detail hereinafter, the data handling module sets the module done bit, number 16, in control status word two to a logic 1 state. The controller instructions for testing engine model X can then be executed. It should be apparent that it is up to the user to condition the execution of his control program to insure that the proper data is in the active data file 4 and to handle such events as "data file not found".

Figure 6:
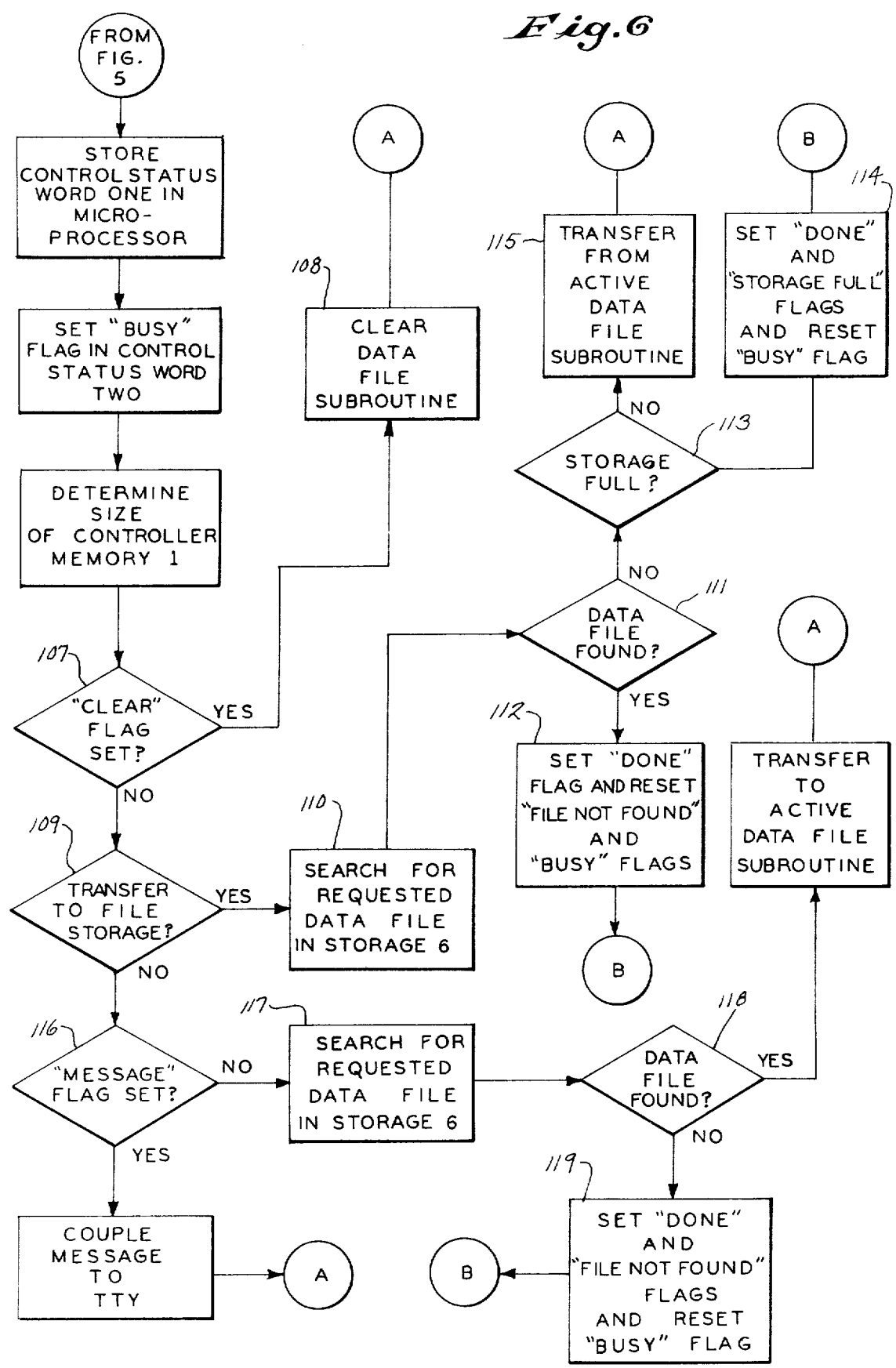
FIG. 6 is a flow chart of a controller service routine which is associated with the executive routine of FIG. 5.

The data handling module is programmed to periodically read control status word one out of the memory 1 and examine bit number sixteen to ascertain whether the module is to perform a function. Referring particularly to the module executive routine stored in the memory 26 and shown in FIG. 5, this is accomplished by a set of instructions represented by the decision block 102 which load control status word one into the A register of the microprocessor 29 and examine bit sixteen. If the system is in the program loader mode as determined by decision block 103, the state of the "start" flag is meaningless and a loop is established until the system is switched to the "run" mode. Once it is established that a function is to be performed by the data handling module, a controller service routine shown in FIG. 6 is entered and executed. The executive routine is re-entered at either point A or point B upon completion of the controller service routine and a loop is established by the decision blocks 104 and 105 to insure that the programmable controller has had sufficient opportunity to reset the "start" flag after the data handling module has completed its task. The loop established by the decision blocks 102, 103 and 106 is again re-entered until another task is to be performed.

Referring particularly to FIG. 6, the primary function of the controller service routine is to establish what function is to be performed by the data handling module and to call up the appropriate subroutine for accomplishing that function. More specifically, the controller service routine reads control status word one from the controller memory 1 and stores it in a microprocessor register. It then reads control status word two from the memory 1, sets the "busy" bit, or flag, to a logic one state, and writes the word back into location 277 (octal) of the controller memory 1. The busy flag remains set until the controller service routine completes execution of the requested function and it therefore serves as a means for inhibiting the programmable controller from making concurrent requests from the data handling module.

Control status word one stored in the microprocessor 29 is next examined to determine the function that is to be performed. As indicated by decision block 107, bit number fifteen is examined to determine whether a data file is to be cleared from data file storage 6 in the controller memory 1, and if so, a clear data file subroutine indicated by process block 108 is called up and executed. If a clear function is not to be performed, a data transfer function is to be performed, and as indicated by decision block 109, bit number fourteen in control status word one is examined to determine the direction of this transfer.

If a transfer is to be made to the data file storage 6 in the memory 1, a search is first made by a routine indicated by the process block 110 to ascertain whether the data file number indicated by bits one through twelve in control status word one can be found. If the data file is already stored in the data file storage 6 as determined by decision block 111, no data transfer is needed and the system returns to the excessive routine of FIG. 5 to await another start command. Before doing so, however, control status word two is read from memory 1 and the "module done" bit number sixteen is set to logic one, the "file not found" bit number thirteen is reset to a logic zero, and the "module busy" bit number fifteen is reset to a logic zero. This is accomplished by instructions indicated by the process block 112 which also writes the control status word two back into the controller memory 1.

As indicated by decision block 113 and process block 114, if the data file storage 6 is filled, no transfer can occur and the system returns to the executive. The "data file storage full" bit number fourteen in control status word two is set to a logic one state to indicate this condition to the programmable controller. If the transfer to data file storage 6 is to occur, a transfer from active data file subroutine indicatd by process block 115 is called up and executed.

If a transfer of data is to be made from the data file storage 6, instructions indicated by decision block 116 are executed to examine bit number thirteen in control status word one. If this bit is at a logic one state, a message is read from the indicated file and coupled to the TTY 28. If this bit is at a logic zero state, a search is made of the storage 6 as indicated by process block 117 to determine whether the requested data file is present. If not as indicated by decision block 118, the system returns to the executive routine through a set of instructions indicated by process block 119 which set and reset the appropriate bits in control status word two. If the data file is found, however, a transfer to active data file subroutine is called up and executed.

Figure 10A:
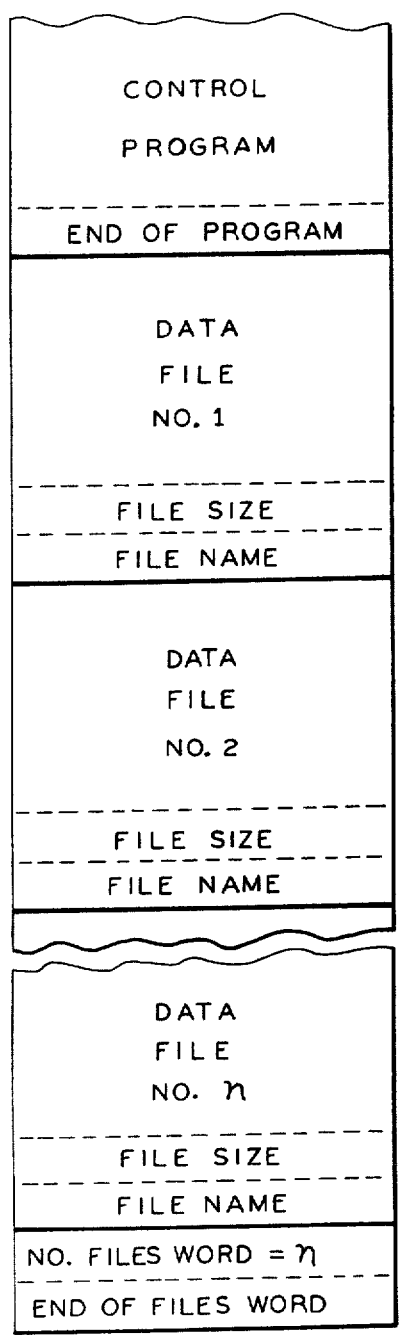

The data file storage 6 is illustrated schematically in FIG. 10a. It is bounded by the "END OF PROGRAM" word and an "END OF FILES" word and includes a "NUMBER OF FILES" word stored adjacent the END OF FILES word which indicates the total number of data files in the storage 6. In addition to data words, each data file in the storage 6 includes a "FILE NAME", or "FILE NUMBER" word and a "FILE SIZE" word. Although the data files are arranged in sequence from top to bottom, the data within each file is arranged in sequence from bottom to top. That is, the FILE NAME and FILE SIZE words are at the beginning of each data file.

Figure 7:
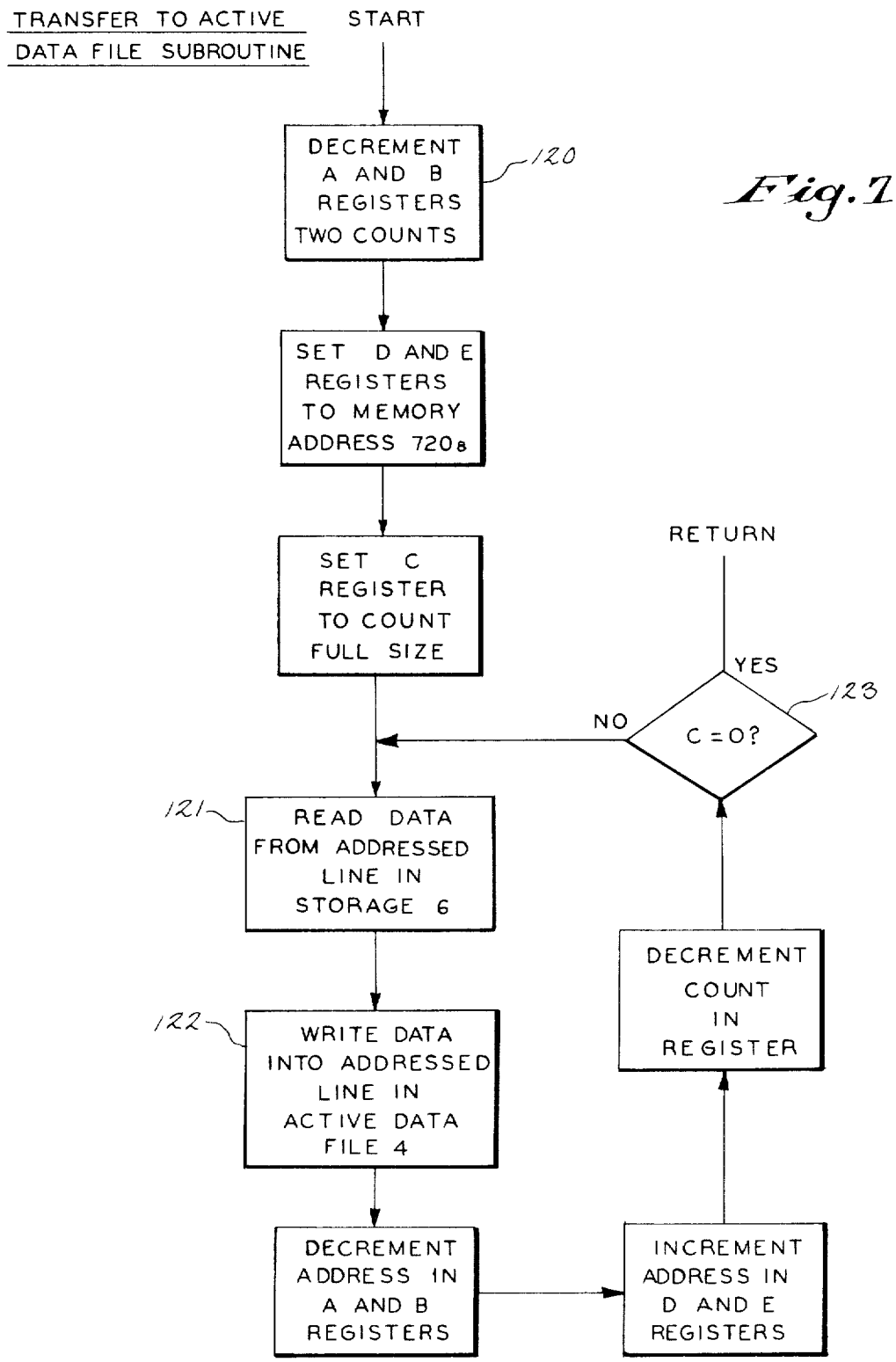
FIG. 7 is a flow chart of a transfer to active data file subroutine which is called up by the routine of FIG. 6.

The transfer to active data file routine operates the data handling module to sequentially read data words from the data file storage 6 and write them into successive memory locations in the active data file 4. Referring to FIG. 7, when this subroutine is entered, the A and B registers in the microprocessor 29 store the memory address of the first word in the requested data file in the file storage 6. By decrementing this memory address two counts as indicated by the process block 120, the memory address of the first data word in the file is obtained. The memory address of the first line in the active data file 4 is then loaded into the D and E registers of the microprocessor 29 and the number of lines in the requested data file (indicated by the FILE SIZE word) is loaded into the microprocessor C register. As illustrated by process blocks 121 and 122, the addressed line in the file storage 6 is read out to the data handling module and then written back into the addressed line in the active data file 4. The memory addresses in the respective microprocessor registers are then decremented and incremented one count and the number in the C register is decremented one count. The process of transferring words of data from the file storage 6 to the active storage 4 continues until the C register is counted down to zero as determined by the decision block 123. At this point the entire data file has been transferred and the system returns to the executive routine in FIG. 5.

Figure 8:
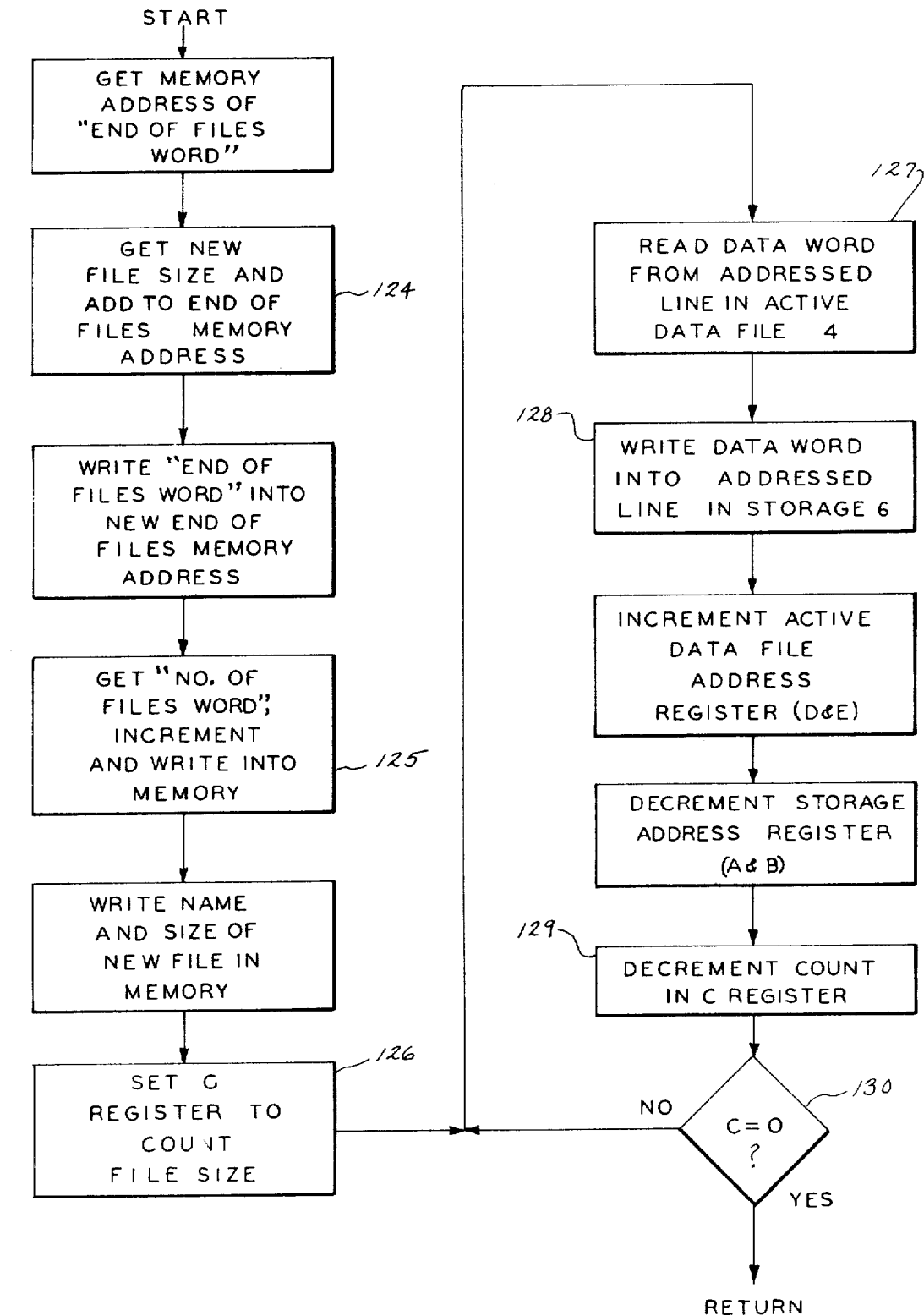
FIG. 8 is a flow chart of a transfer from active data file subroutine which is called up by the routine of FIG. 6.
Figure 10B:
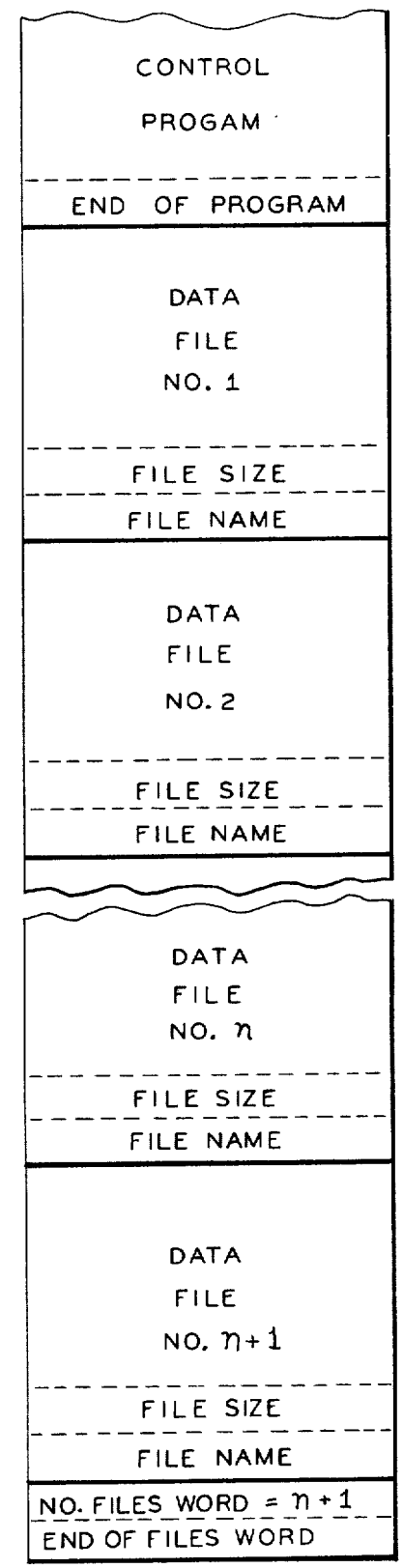

When transferring a data file from the active data file 4 to the data file storage 6, the transferred file is added to the end of those already in the storage 6 as indicated in FIGS. 10a and 10b. First, the memory address of the END OF FILES word is loaded into the microprocessor accumulator and the FILE SIZE word in the data file to be transferred is added to this address as indicated in FIG. 8 by process block 124. The END OF FILES word is then written into the controller memory at this newly calculated end of files memory address. The NUMBER OF FILES word is then read from the controller memory by the data handling module, incremented one count and written back into memory adjacent of END OF FILES word as indicated by process block 125. The FILE NAME and FILE SIZE words for the new data file are then transferred to the file storage 6 and written immediately above the NUMBER OF FILES word and the C register in the microprocessor 29 is set to the count indicated in this FILE SIZE word as indicated by process block 126. The memory address of the first line in the active data file 4 is stored in the D and E registers of the microprocessor 29 and the memory address of the first empty line in the data file storage 6 is stored in the microprocessor A and B registers. As indicated by process blocks 127 and 128, a loop is entered in which the contents of the addressed line in the active data file 4 are read from the memory 1 by the data handling module and are written into the addressed line of the data file storage 6. The A and B register are then decremented and the C and D registers are then decremented and the C and D registers are incremented to address the respective next lines in the memory and the C register is decremented one count as indicated by process block 129. As indicated by decision block 130, a check of the C register is made to determine whether it has been counted down to zero, and if not, the system remains in the loop to transfer another line of the active data file. After the entire data file has thus been transferred, as determined by the contents of the C register, the subroutine returns to the executive.

Figure 9:
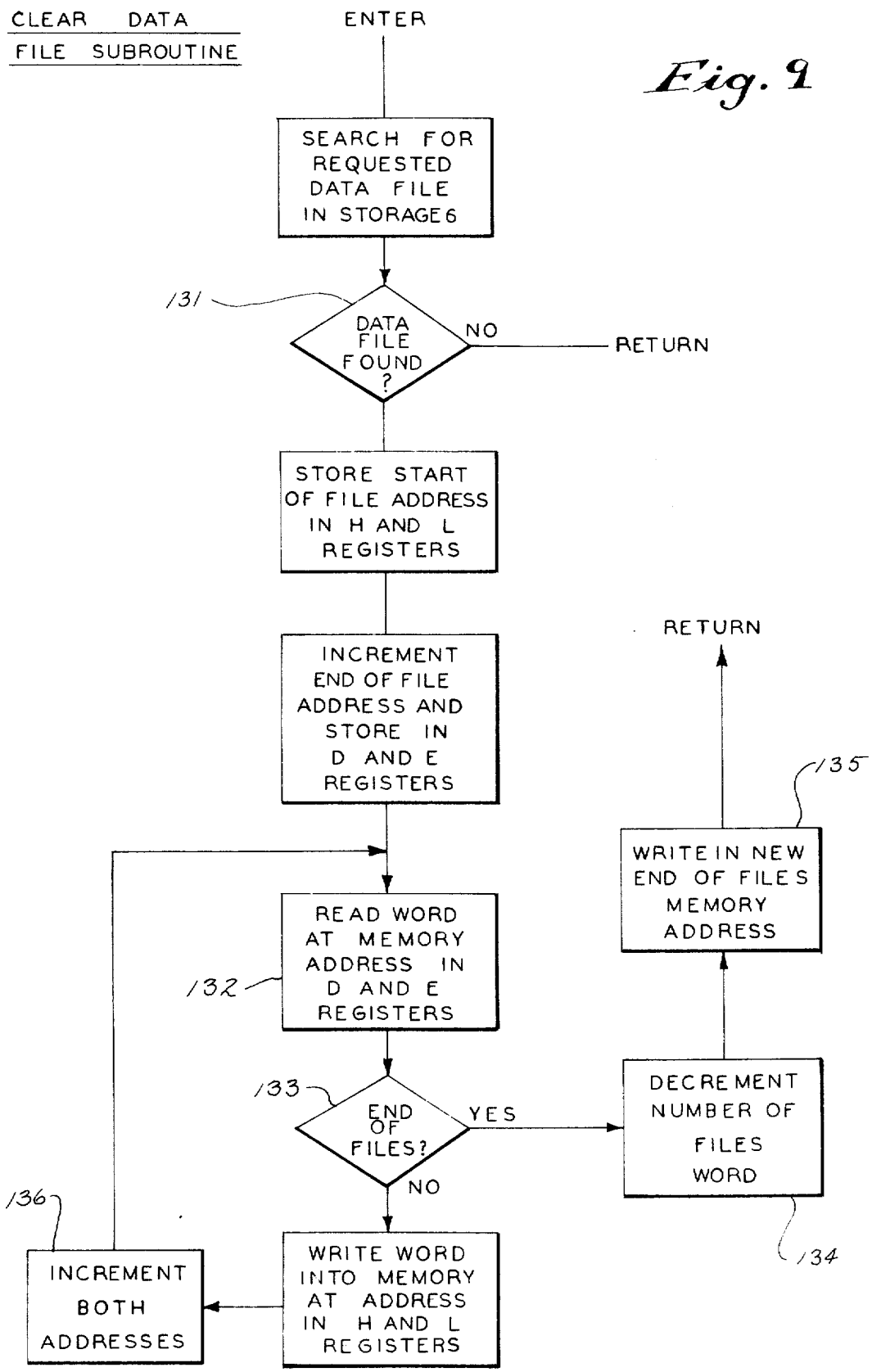
FIG. 9 is a flow chart of a clear data file subroutine which is called up by the routine of FIG. 6, and FIGS. 10a and 10b are schematic representations of data stored in portions of the controller memory.

The clear data file subroutine is illustrated in the flow chart of FIG. 9, and as its name implies, it serves to clear, or erase, a specified data file from the data file storage 6. In addition, however, this subroutine serves to close the gap in the storage 6 which results from the clear operation. The first step in the process is to search for the data file to be cleared by comparing the identification number of each stored data file with that stored in the control status word one. If the data file is not found, as indicated by decision block 131, nothing further need be done and the system returns to the executive to await another start command from the programmable controller.

On the other hand, if the identified data file is found, its starting address is stored in the microprocessor H and L registers, and the address of the first memory line following the data file is stored in the D and E registers. As indicated by process block 132 and decision block 133, the contents of the memory line following the data file to be cleared is read out and examined to determine if it is the END OF FILES word. If so, the subroutine is exited through process blocks 134 and 135 which decrement the NUMBER OF FILES word and shift it and the END OF FILES word upward to follow the preceding data file. If the data file to be cleared is stored last, therefore, it is effectively cleared by altering and shifting the END OF FILES and NUMBER OF FILES words to indicate that the cleared file is not present.

In most instances the file to be cleared is disposed between existing data files in the storage 6. This is indicated by the decision block 133 which branches to a loop that transfers, or shifts upward, all data files following the file to be cleared. More specifically, the word at the memory address indicated by the D and E registers in the microprocessor 29 is read out of the memory 1 and written back into it at the address indicated by the H and L registers. These two memory addresses are then incremented as indicated by process block 136, and the process is repeated until the END OF FILES word is read from memory 1. The data file to be cleared is thus written over by the data which is transferred upward to not only clear it, but to close the gap in the storage 6 which would otherwise be created by the mere erasure of the data file.

A portion of the program stored in the data handling module read-only memory 26 which illustrates the functions performed by the microprocessor 29 will now be listed. This portion of the program carries out the functions indicated by the first two process blocks in FIG. 6.

| OPER-ATION | OPERAND | COMMENTS |
|---|---|---|
| LAI | 277B | Get and store in microprocessor A register lower portion of memory address of control status word one. |
| OUT | PLCLA | Load contents of microprocessor A register into address latch 47. |
| LAI | 300B | Store in microprocessor A register upper portion of memory address of control status word one and "read" bit. |
| OUT | PLCHA | Load contents of microprocessor A register into address latch 48. This also initiates an interrupt to read data from controller memory 1. |
| INP | PLCST | Wait until interrupt is granted |
| NDI | 010B | and control status word one |
| JNZ | $-3 | has been stored in data handling module latches 67 and 68. |
| INP | PLCLH | Input higher 8-bits of status word one from data latch 68. |
| NDA |  | Test to determine if start transfer bit (15) is set. |
| JTS | CKXFR | Jump if start transfer bit is not set. |
| LDA |  | Transfer higher 8-bits of status word one from A register to D register. |
| INP | PLCLI | Input lower 8-bits of status word one from data latch 67. |
| LEA |  | Transfer lower 8-bits of status word one from A register to E register. |
| LAI | 100B | Get constant from memory 26 which represents the "busy bit" and store in A register. |
| OUT | PLCHO | Output contents of A register to data latch 54. |
| XRA |  | Set A register to all zeros. |
| OUT | PLCLO | Output contents of A register to data latch 53. |
| LAI | 276B | Get and store in A register lower portion of memory address of control status word two. |
| OUT | PLCLA | Load contents of A register into |

-continued

| OPER-ATION | OPERAND | COMMENTS |
|---|---|---|
|  |  | address latch 47. |
| LAI | 100B | Get and store in A register upper portion of memory address of control status word two and "write" bit. |
| OUT | PLCHA | Load contents of A register into address latch 48. This initiates an interrupt which writes a logic "one" into bit 15 (busy bit) of status word two. |
| INP | PLCST | Wait until write function |
| NDI | 010B | has been completed then |
| JNZ | $-3 | continue with program. |

Although the control status register 3, active data file 4, control program 5 and data file storage 6 are embodied in a single read/write memory 1 in the above described system, it should be apparent to those skilled in the art that one or more of these elements may be embodied in separate storage devices. This and other variations in the preferred embodiment of the invention may be made without departing from the spirit of the invention which is defined in the following claims.

We claim:

1. In a programmable controller having a memory which stores a control program and a processor which sequentially and continuously reads out instructions that comprise the control program and executes them to control a machine, the combination comprising:
an active data file storage which is coupled to said processor and which stores a data file that is operated upon by said processor in response to control program instructions which it executes to control said machine;
a data file storage which stores a plurality of data files, each of which is suitable for storage in said active data file storage and each of which includes data to be operated upon by said processor to control said machine;
a control status register, coupled to said processor and including a first storage location which may be set to a selected state by said processor in response to the execution of a control program instruction to indicate that the transfer of a particular data file from said data file storage to said active data file storage is to occur, file identification storage locations which may be set to a selected state by said processor to identify the particular data file to be transferred, and a second storage location which may be examined by said processor in response to the execution of another control program instruction to indicate whether or not said transfer has been completed; and
a data handling module coupled to said control status register, said active data file storage and said data file storage, said data handling module including:
(a) examining means, coupled to said control status register, for periodically examining said first storage location therein and indicating when a transfer is to occur;
(b) selecting means, coupled to said control status register and being responsive to the contents of said file identification storage locations therein, for selecting the data file to be transferred;
(c) transferring means, coupled to said selecting means, said active data file storage and said data file storage, for tranferring said particular data file from said data file storage to said active data file storage when the transfer is indicated by said examining means; and (d) means responsive to said transfer means and coupled to said control status register, for setting the state of said second storage location therein to indicate that the transfer has been completed.

2. The programmable controller as recited in claim 1 in which said control register includes a third storage location which may be set to a selected state by said processor in response to the execution of a control program instruction to indicate that the data file in the active data file storage is to be transferred to said data file storage, and said data handling module further includes:

(e) second examining means coupled to said control status register for periodically examining said third storage location therein and indicating when a transfer is to occur;

(f) second transferring means coupled to said last named means, said active data file storage and said data file storage for transferring the data file from said active data file storage to said data file storage.

3. The programmable controller as recited in claim 1 in which said control status register includes a fourth storage location which may be set to a selected state by said processor in response to the execution of a control program instruction to indicate that the particular data file in the data file storage indicated by said file identification storage locations is to be cleared, and said data handling module further includes:

(g) third examining means coupled to said control status register for periodically examining said fourth storage location therein and indicating when a data file is to be cleared;

(h) second selecting means coupled to said control status register and being resonsive to the contents of said file identification storage locations therein for selecting the particular data file to be cleared; and (i) clearing means coupled to said second selecting means for clearing said particular data file when the clearing event is indicated by said third examining means.

4. The programmable controller as recited in claim 1, in which said control status register includes a fifth storage location which may be set to a selected state by said data handling module to indicate the status of said data handling module, and said data handling module further includes:

(j) means coupled to said control status register for setting said fifth storage location to said selected state.

* * * * *